United States Patent
Andersen et al.

(10) Patent No.: US 8,327,410 B2
(45) Date of Patent: Dec. 4, 2012

(54) NETWORKED-ENABLED MASS STORAGE DONGLE WITH NETWORKED MEDIA CONTENT AGGREGATION

(75) Inventors: David B. Andersen, Hillsboro, OR (US); Michael Sabo, Escondido, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 12/335,126

(22) Filed: Dec. 15, 2008

(65) Prior Publication Data

US 2010/0154014 A1   Jun. 17, 2010

(51) Int. Cl.
*H04N 7/173* (2011.01)
*H04N 7/16* (2011.01)

(52) U.S. Cl. ........ 725/110; 725/139; 725/140; 725/141; 725/142

(58) Field of Classification Search .................. 725/110, 725/139, 140–142
See application file for complete search history.

(56) References Cited

U.S. PATENT DOCUMENTS

| | | | |
|---|---|---|---|
| 6,314,111 B1 * | 11/2001 | Nandikonda et al. | 370/473 |
| 7,328,225 B1 | 2/2008 | Beloussov et al. | |
| 7,428,540 B1 | 9/2008 | Coates et al. | |
| 2006/0253910 A1 | 11/2006 | Yamamichi et al. | |
| 2007/0155204 A1 | 7/2007 | Klitsner et al. | |
| 2008/0192818 A1 * | 8/2008 | DiPietro et al. | 375/240.01 |
| 2008/0244644 A1 | 10/2008 | McCausland | |
| 2010/0169778 A1 * | 7/2010 | Mundy et al. | 715/716 |

FOREIGN PATENT DOCUMENTS

| | | |
|---|---|---|
| EP | 1768022 A2 | 3/2007 |
| EP | 2214380 A1 | 8/2010 |
| JP | 2002-108363 A | 4/2002 |
| JP | 2007280261 | 10/2007 |

OTHER PUBLICATIONS

Office Action received for European Patent Application No. 09252746.4, mailed on dated Jul. 15, 2010, 5 pages.
http://www.eye.fi/.
http://www.globalsources.com/manufacturers/WIFI-Dongle.html.
http://www.nextag.com/wireless-media-adapter/search-html.
Office Action from corresponding China application No. 200910260414.7, filed Dec. 15, 2009; Office Action mailed Dec. 31, 2011; 8 pages.
Office Action from corresponding Japan application No. P2009280504, filed Dec. 10, 2009; Office Action mailed Feb. 20, 2012; 4 pages.
Notice of Allowance from corresponding application in Japan; Application No. P2009-280504, mailed Jul. 17, 2012; 6 pages.

* cited by examiner

*Primary Examiner* — Kieu Oanh T Bui
(74) *Attorney, Agent, or Firm* — Garrett IP, LLC (57) ABSTRACT

Embodiments of a network-enabled mass storage dongle with networked media content aggregation are discussed. Embodiments provide for a dongle in a consumption mode is inserted into one or more source devices, where the one or more source devices are part of a network and store content to be aggregated for accessing on equipment. In embodiments the equipment has no intrinsic networking capabilities. The dongle allows a user to select one or more directory structures on each of the one or more source devices to be included in the aggregated content. The dongle then creates a file share for each of the selected directory structures. The dongle in an aggregation mode is inserted into the equipment and automatically connects to the network. The dongle aggregates content in the created file shares to present the aggregated content as a single mass storage device to the equipment. Other embodiments are described and claimed.

20 Claims, 6 Drawing Sheets

NETWORKED-ENABLED MASS STORAGE DONGLE WITH NETWORKED MEDIA CONTENT AGGREGATION

BACKGROUND

Today's homes may have one or more means for receiving and displaying content via a single display device. For example, various electronic devices in the home may be networked together in such a way to provide a user with a means for entertainment. While many of today's homes may have one or more means for receiving, storing and/or displaying content, such as media content, there still exist user experience limitations for many of these devices. For example, today if a user wishes to access media content stored on the home network from his or her digital television (directly or via a set-top box) the user experience can be awkward in many instances.

For example, many digital televisions do not have intrinsic networking capabilities. Here, if the digital television supports a mass storage device, the user can physically go to a source device containing the desired media content and copy the media content to the mass storage device and then insert the mass storage device into the digital television for viewing. Naturally, there are limitations on how many files can be viewed at a time and the process must be repeated each time new or different content is to be viewed on the digital television.

Alternatively, in another approach, the user may use a commercial Digital Media Adapter (DMA) as an intermediary between the digital television and the home network. Here, the DMA may deliver video and analog signals directly to the digital television from source devices, either in analog or digital formats, as appropriate. However, the DMA requires media server software to be running on the source devices storing the desired media content. In addition, the DMA typically has its own user interface in which the user must become familiar. DMAs of today are often viewed as being very difficult and unsatisfying to use.

In yet another approach where the digital television may have intrinsic networking capabilities and support Digital Living Network Alliance (DLNA) protocols, the use of a separate DMA with its own user interface may be eliminated. But, here, this approach still relies on the source devices in the home network to be running (at all times) the media server software.

DETAILED DESCRIPTION

Various embodiments of the invention may be generally directed to a network-enabled mass storage dongle with networked media content aggregation. Embodiments allow a user to more easily access media content stored on various devices in a network ("source devices") via a digital television (either directly or via a set-top box), even though the digital television has no intrinsic networking capabilities, although embodiments are not limited to this. This access of the source devices via the digital television may be done without the use of a Digital Media Adapter (DMA) and without the need for media server software to be running at all times on the source devices. In embodiments, the digital television only requires the ability to play or display content that is stored on a mass storage device, such as a Universal Serial Bus (USB) Thumb Drive, Secure Digital (SD) memory card, compact flash memory card, and so forth. Embodiments of the invention provide for a network-enabled mass storage drive or dongle that is capable of operating in a consumption mode and an aggregation mode.

While operating in the consumption mode, the dongle is inserted by a user in a source device in a home network, for example, that contains media content to be aggregated for viewing on the digital television. Here, a consumption module of the dongle guides the user through a selection process and creates a unique password protected file share for the source device. In embodiments, the file share may be a network file share. This process may be repeated for each source device in the network that contains media content to be aggregated for viewing on the digital television.

The dongle is then placed in aggregation mode and inserted into the digital television. Here, in embodiments, the dongle represents itself to the digital television as a single mass storage device, automatically connects to the network and maps all of the file shares that were created while the dongle was in consumption mode. An aggregation module of the dongle presents the aggregation of the media files in the file shares as a single mass storage device to the digital television.

An important aspect of embodiments of the invention is that the user is not required to find or set any networking parameters, nor asked to set up any file shares since all of this is handled via the dongle while in consumption mode. Another important aspect of embodiments of the invention is that the user does not need to be aware of which source device a desired media file or content is physically located. This is because all of the media content is aggregated (along with any user-established directory trees or structures) when the dongle is in aggregation mode and inserted into the digital television. To the user, the aggregated content appears to be under a single mass storage device or aggregated media drive. Here, as new media files or content are added to any of the user-established directory trees or structures, the files simply appear in the appropriate place on the digital television's aggregated media drive via the dongle with no user action required. Other embodiments may be described and claimed.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
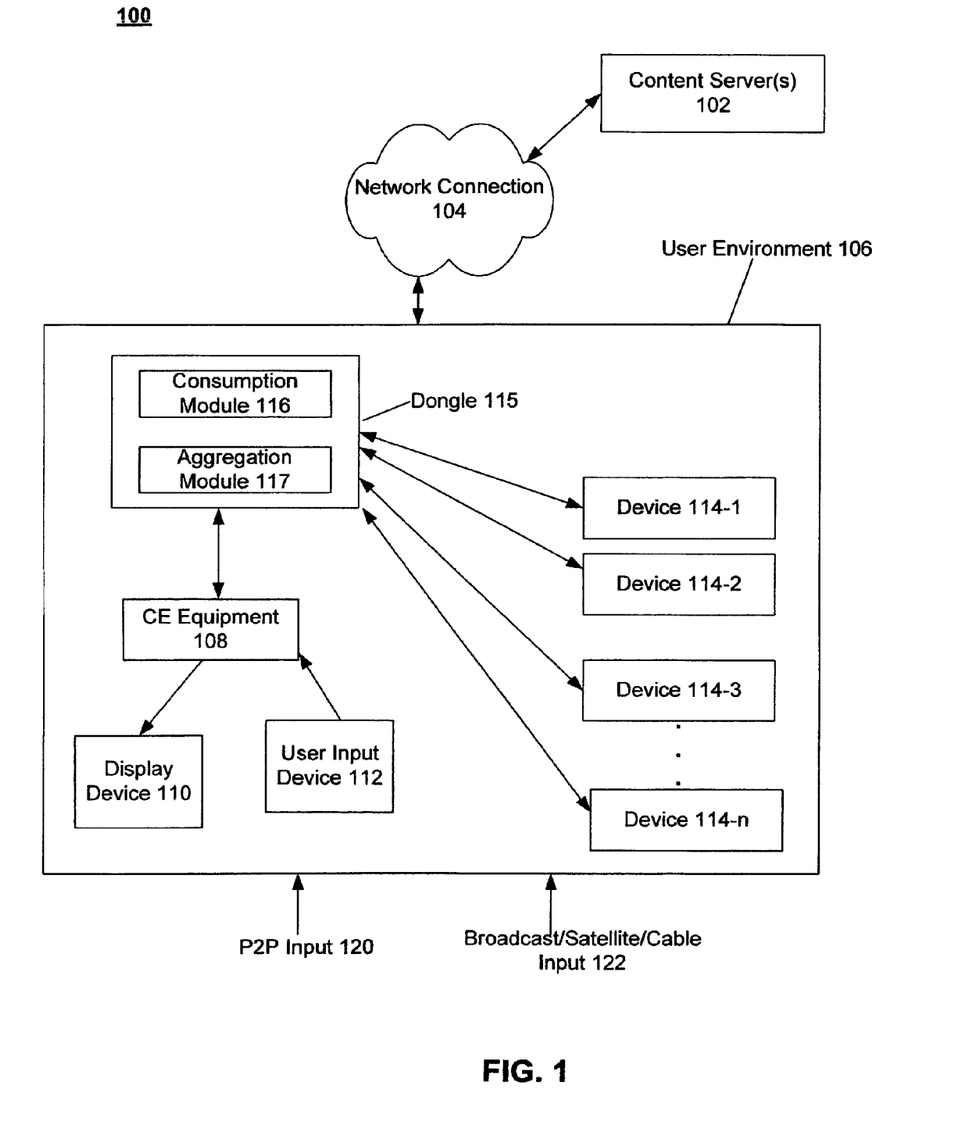
FIG. 1 illustrates one embodiment of a system.

FIG. 1 illustrates an embodiment of a system 100. Referring to FIG. 1, system 100 may comprise content server(s) 102, a network connection 104 and a user environment 106. User environment 106 may include consumer electronics (CE) equipment 108, a display device 110, a user input device 112, devices 114 (114-1 through 114-*n*, where n is any positive integer) and a network-enabled mass storage dongle 115. Dongle 115 may include a consumption engine or module 116 and an aggregation engine or module 117. A P2P input 120 and broadcast/satellite/cable inputs 122 are accessible to user environment 106. Possible inputs or connections may also include DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth. Each of these elements is described next in more detail.

Content servers 102 may include content that is accessible via network connection 104. Content servers 102 may communicate with user environment 106 (as well as other user environments not shown in FIG. 1) via network connection 104. Network connection 104 may be a high speed Internet connection or any other type of connection suited for the particular application. Other types of connections may be added or substituted as new connections are developed.

In embodiments, user environment 106 may include CE equipment 108. CE equipment 108 may represent a digital television, for example. Even though embodiments of the invention may be described herein as equipment 108 being CE equipment or a digital television, this is not meant to limit the invention. Equipment 108 may be any device capable of playing/displaying content that is stored on a mass storage device, such as a Universal Serial Bus (USB) Thumb Drive, Secure Digital (SD) memory card, compact flash memory card, and so forth. CE equipment 108 is not required to have intrinsic networking capabilities, although embodiments are not limited to this.

CE equipment 108 may also be associated with display device 110 and/or user input device 112. Display device 110 may be a monitor, projector, a conventional analog television receiver, a MID, cell phone, PC, laptop, or any other kind of device with a perceivable video display. The audio portion of the output of the connected devices may be routed through an amplifier, such as an audio/video (A/V) receiver or a sound processing engine, to headphones, speakers or any other type of sound generation device. User input device 112 may be any type of input device suited for a user to communicate with CE equipment 108.

In embodiments, network-enabled mass storage dongle 115 enables a user to more easily access media content stored on various devices in a network (source devices) via CE equipment 108, even though CE equipment 108 has no intrinsic networking capabilities, although embodiments are not limited to this. The access of the source devices by CE equipment 108 may be done without the use of a DMA and without the need for media server software to be running at all times on the source devices. In embodiments, dongle 115 is adapted to receive multiple inputs supporting different sources of media or content. The multiple inputs may represent various types of connections including wired, wireless, or a combination of both.

More specifically, the multiple inputs may represent Internet Protocol (IP) input connections (e.g., network connection 104), a person-to-person (P2P) input connection 120, broadcast/satellite/cable input connections 122, DVB-H and DMB-T transceiver connections, ATSC and cable television tuners, UMTS and WiMAX MBMS/MBS, IPTV through DSL or Ethernet connections, WiMax and Wifi connections, Ethernet connections, and inputs from various electronic devices 114-1 through 114-n.

Example electronic devices 114 may include personal computers (PCs), digital televisions (DTVs), digital video disk (DVD) players, video cassette recorder (VCR) players, compact disk (CD) players, set-top boxes (STBs), stereo receivers, audio/video receivers (AVRs), media centers, personal video recorders (PVRs), digital video recorders (DVRs), gaming devices, digital camcorders, digital cameras, blackberries, cellular phones, personal digital assistants (PDAs), flash devices, laptops, and so forth. Electronic devices 114 are not limited to these examples.

In embodiments, the content may be any type of content or data. Examples of content may generally include any data or signals representing information meant for a user, such as media information, voice information, video information, audio information, image information, textual information, numerical information, alphanumeric symbols, graphics, and so forth. The embodiments are not limited in this context.

As mentioned above, network-enabled mass storage dongle 115 may include consumption module 116 and aggregation module 117. Consumption module 116 may facilitate the consumption mode or functionality of dongle 115. Aggregation module 117 may facilitate the aggregation mode or functionality of dongle 115. Dongle 115 may be any drive or device adapted to perform the functionality of the embodiments described herein.

While operating in the consumption mode (toggled from aggregation mode via a switch or other means), dongle 115 is inserted into or connected with a source device in a home network, for example, that contains media content to be aggregated for viewing on CE equipment 108. Devices 114 may include such a source device. In embodiments, a source device to be used by dongle 115 is not required to run special media server software. The source device only needs to be capable of file sharing. One example type of file sharing is a network file sharing (e.g., Common Internet File System (CIFS) file sharing), but embodiments of the invention are not limited to this.

Once inserted into the source device, the source device senses dongle 115 and, in embodiments, dongle 115 may appear to the source device to be a Compact Disk-Read Only Memory (CD-ROM) with an autorun file (which is the consumption module 116). Consumption module 116 executes and guides the user through a process of selecting which directory trees or structures on the source device should be made available to CE equipment 108 via dongle 115. Consumption module 116 also creates a unique password protected file share for the selected directory trees or structures of the source device. In embodiments, the file share may be a network file share. A example network file share is a CIFS network file share, but embodiments of the invention are not limited to this. Also, in embodiments, module 116 automatically creates a name and password for the newly created CIFS network file share. In embodiments, consumption module 116 stores the CIFS share names, passwords, IP address and any other required information about the network on the dongle's non-volatile memory. Example information about the network may include service set identifier (SSID), Wired Equivalent Policy (WEP) keys, and so forth. Embodiments of the invention are not limited in this context.

In embodiments, the user may repeat this process for every source device containing content that is to be aggregated for viewing on CE equipment 108 via dongle 115. The process may also be repeated when the user desires to change or update what is available for viewing via dongle 115. For example, the user may wish to add or delete a directory to the directory tree or structure for a particular source device and thus modify the CIFS network file share for the source device. The user may also wish to change their network configuration and thus needs to update the necessary CIFS network file shares.

An important aspect of embodiments of the invention is that the user is not required to find or set any networking parameters, nor asked to set up any CIFS network file shares since all of this is handled via consumption module 116.

In embodiments, dongle 115 may be placed in aggregation mode (toggled from consumption mode via a switch or other means) and inserted into or connected with CE equipment 108. Here, in embodiments, dongle 115 represents itself to CE equipment 108 (e.g., digital television) as a single mass storage device or aggregated media drive. Dongle 115 automatically connects to the network and aggregation module 117 maps all of the CIFS network file shares that were created while dongle 115 was in consumption mode. Aggregation module 117 presents the aggregation of the media files in the file shares as a single mass storage device or aggregated media device to CE equipment 108.

Another important aspect of embodiments of the invention is that the user does not need to be aware of which source device a desired media file or content is physically located. This is because all of the media content is aggregated (along with any user-established directory trees or structures) when dongle 115 is in aggregation mode and inserted into CE equipment 108. To the user, the aggregated content appears to be under a single mass storage device or aggregated media drive. Here, as new media files or content are added to any of the user-established directory trees or structures, the files simply appear in the appropriate place on the CE equipment's aggregated media drive via dongle 115 with no user action required.

It is important to note that although consumption module 116 and aggregation module 117 are illustrated in FIG. 1 as two separate modules or components, embodiments of the invention are not limited in this context. For example, the functionality of modules 116 and 117 may be combined into one component or may be separated into three or more components.

Although embodiments of the invention described herein may be described as a home entertainment system or home network, this is not meant to limit the invention. Embodiments of the invention are applicable to any connected environment including, but not necessarily limited to, an office environment, research environment, hospital or institutional environment, and so forth.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

As described above and in embodiments, dongle 115 represents itself to CE equipment 108 (e.g., digital television) as a single mass storage device or aggregated media drive. Embodiments of the invention provide for the display of the aggregated media drive via dongle 115 or "dongle content" or "aggregated content" over main content currently being displayed via CE equipment 108. For example, the main content may be displayed in a main content section of the display screen, where the main content section includes the entire screen. The dongle content may be displayed in a dongle content section, where the dongle content section is overlayed in some way over the main content section on the screen.

Figure 2:
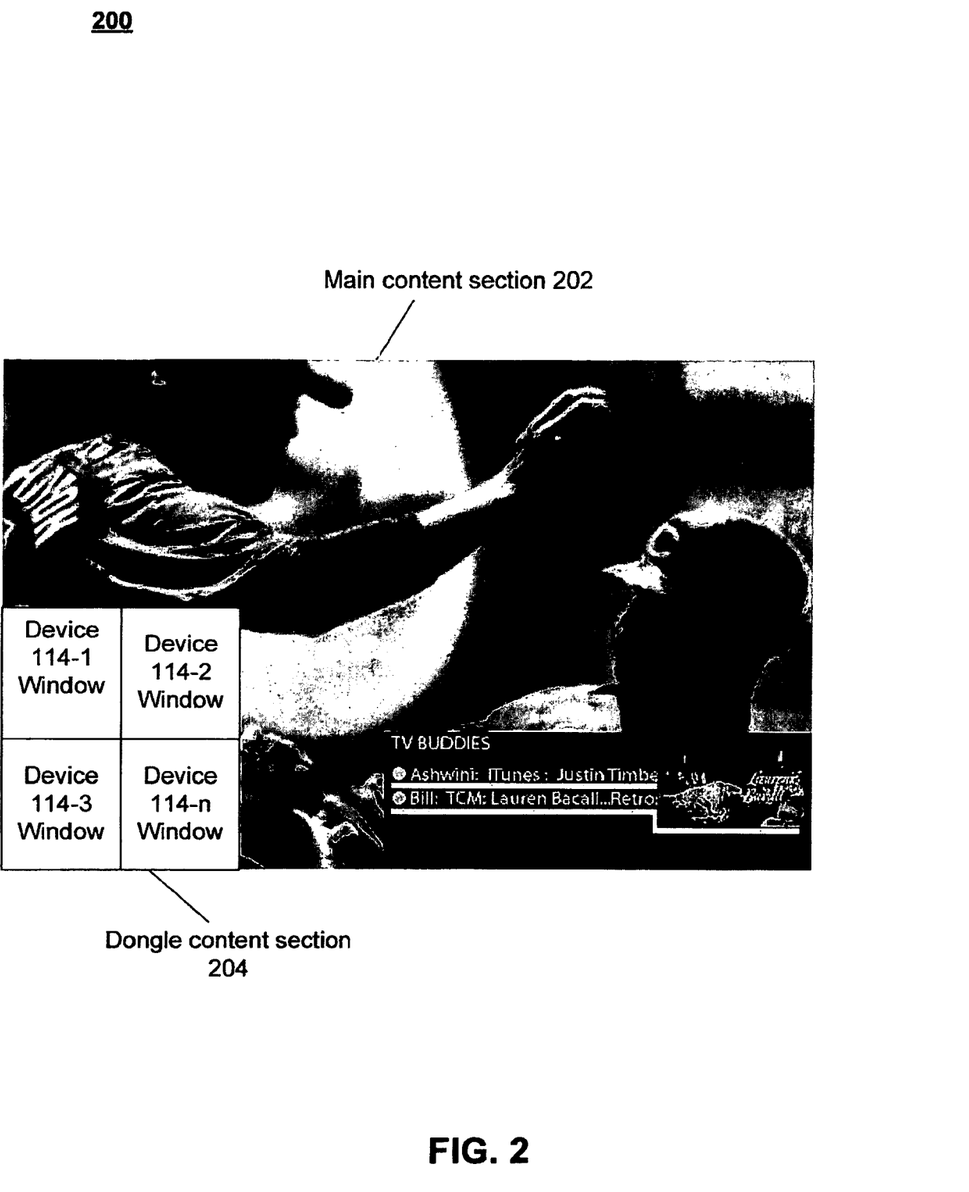
FIG. 2 illustrates one embodiment of a user interface.

Referring to FIG. 2, one embodiment of a user interface 200 is shown. User interface 200 may comprise a main content section 202 and a dongle content section 204. User interface 200 may be displayed on display device 110 (FIG. 1), for example. In embodiments, dongle content section 204 may have as many sub-sections or windows as the number of source devices in the network that are represented in the dongle content (i.e., one sub-section or window for each file share that was created while dongle 115 was in consumption mode). This is not meant to limit the invention. Each of these sections is described next in more detail.

In embodiments, main content section 202 displays the primary or main content that is being watched by a user via CE equipment 108, for example. The main content may be broadcasted, received via cable or satellite feeds, pre-recorded and stored on a digital recording device (such as a PVR or DVR), streamed or downloaded via the Internet via an IP connection, stored on a home local area network (LAN), received via various types of video interconnects (e.g., Video Graphics Array (VGA), High-Definition Multimedia Interface (HDMI), component video, composite video, etc.), and so forth. Connections or inputs may also include via DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth. In embodiments, the content being displayed in section 202 cannot be altered by the user. The content displayed in section 202 may include shows or programs, graphics, video games, books, video shorts, video previews, news clips, news highlights, and so forth. Related voice, audio, music, etc., may also be presented with the displayed content in section 202.

In embodiments, content displayed in dongle content section 204 may represent the dongle content (i.e., aggregated media drive as defined via dongle 115 and aggregated module 117). In embodiments, content displayed in section 204 may be any content or information or graphics (e.g., audio, video or graphics signal) or text (e.g., URL link), for example. In embodiments, the content may be streamed or downloaded to the source device from the Internet via an IP connection (for example, via content server 102 and network connection 104 from FIG. 1), via a P2P connection (such as input 120), via broadcast/satellite/cable (such as input 122), DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth. In other embodiments, the content may be content received via any USB device connection (such as from devices 114). User interface 200 may be displayed on a display device (such as display device 110). A television may be an example display device. Other examples may include, but are not limited to, a mobile Internet device (MID) that has a screen that displays video, a cell phone, a PC, laptop, or any other device that is adapted to facilitate embodiments of the invention.

In embodiments, dongle 115 and/or CE equipment 108 allows the user to customize the display of the dongle content. For example, in embodiments, the main content may be displayed in main content section 202 of the display screen, where main content section 202 includes the entire screen.

The dongle content may be displayed in dongle content section 204, where the dongle content section is overlayed in some way over the main content section on the screen. In embodiments, dongle content section 204 may represent the aggregated media content drive via individual windows for each of the source devices. The dongle content may also be displayed as individual user-established directory trees or structures. Embodiments of the invention allow the user to customize the display of the main and dongle content sections (e.g., placement on screen, size, volume level of audio associated with content, quality (e.g., opaque or transparent), audio only, visual only, and so forth). Embodiments of the invention are not limited in this context.

Referring again to FIG. 2, user interface 200 illustrates one display format where section 204 is smaller in size than main content section 202 and positioned on the lower-left area of user interface 200. Embodiments of the invention are not limited to the display format illustrated in FIG. 2. In fact, embodiments of the invention allow the user to customize the content displayed in section 204 and to customize the position and size of section 204 in user interface 200. Here, the user may download a program element to dongle 115 or CE equipment 108 from an IP delivered site or service or from a USB device (for example) that allows the user to customize section 204 to reflect user preferences. The customization of section 204 may include the number of windows, the content displayed in each of its windows, the size and location of section 204 on user interface 200, and so forth. In embodiments, the user may elect to watch what is being displayed in a window of dongle content section 204. Here, the window may be expanded to include all of user interface 200.

In embodiments, the user may use dongle 115 or CE equipment 108 to overlay or blend the dongle content with main content on the single display device without altering the main content. In embodiments, the main content may be decoded and then re-encoded with the dongle content. In embodiments, the overlay or blending of the dongle content and main content may be a hardware-enabled overlay or blend via a microprocessor, chipset, graphics card, etc. In other embodiments, the overlay or blending of the dongle content and main content may be a software-enabled overlay or blend via a specific application, operating system, etc. In yet other embodiments, the overlay or blending may be via a combination of hardware and/or software components. In addition, there may be some overlay or blending in the pipes themselves or via another method while the content is in route to the screen. This may be implemented with wireless connection technology, wired connection technology, or a combination of both.

Embodiments of the invention also allow for the user to define customization rules that involve triggers upon defined events. One example may include when main content section 202 starts to display a commercial then enlarge dongle content section 204 on the screen for easier searching through the content. Once the commercials are over, then decrease dongle content section 204 to normal size. Embodiments of the invention are not limited in this context.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 3:
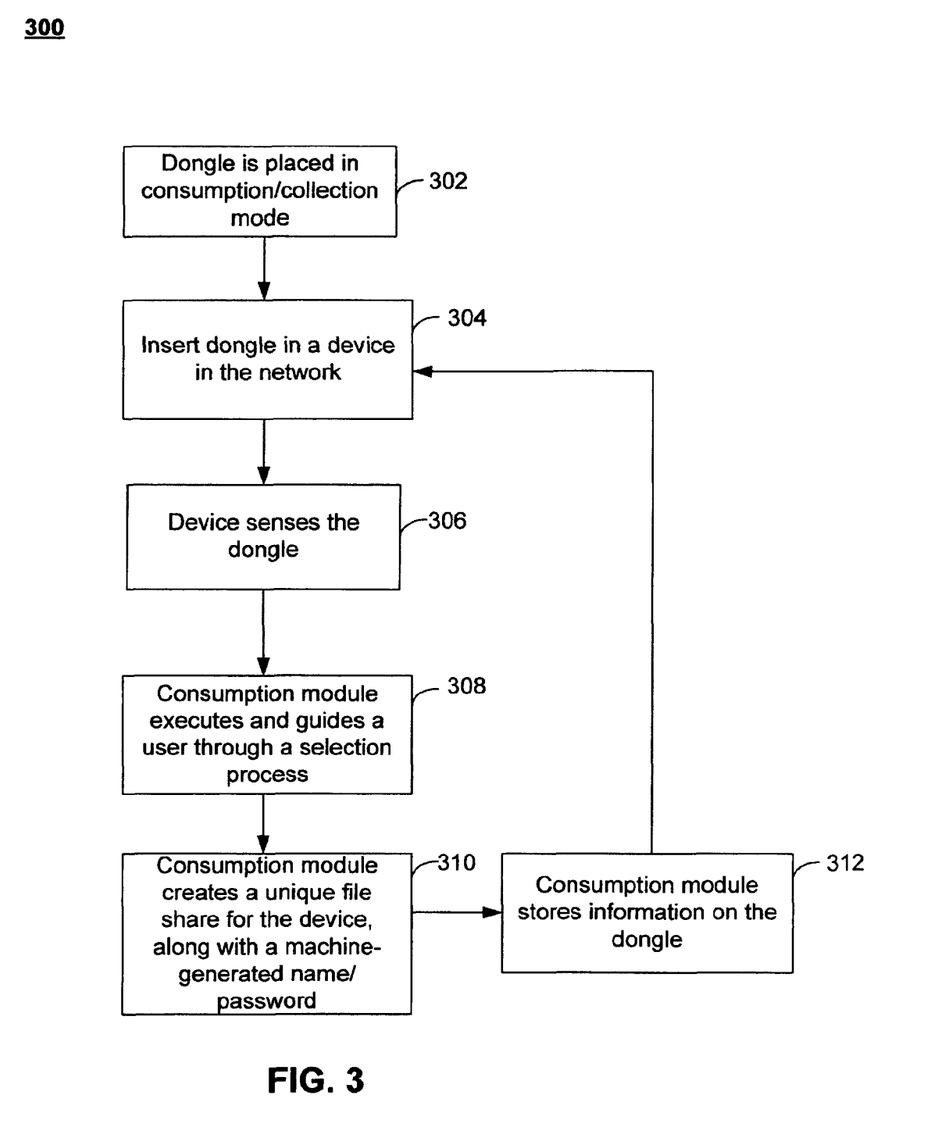
FIG. 3 illustrates one embodiment of a logic flow.

FIG. 3 illustrates one embodiment of a logic flow 300. Each of the blocks in logic flow 300 was described in more detail above and details of such will not be repeated. As shown in logic flow 300, a network-enabled mass storage drive or dongle (such as dongle 115 from FIG. 1) is placed in consumption or collection mode (block 302). The dongle is then inserted in a source device in the network by the user (block 304). The source device senses the dongle (block 306). The consumption module (such as module 116 of FIG. 1) executes and guides the user through a selection process (block 308). The consumption module creates a unique network file share (such as a CIFS network file share) for the source device, along with a machine-generated name/password (block 310). The consumption module stores the information on the dongle (block 312). In embodiments, the consumption module may store the CIFS share names, passwords, IP address and any other required information about the network on the dongle's non-volatile memory. Example information about the network may include service set identifier (SSID), Wired Equivalent Policy (WEP) keys, and so forth. Embodiments of the invention are not limited in this context.

Figure 4:
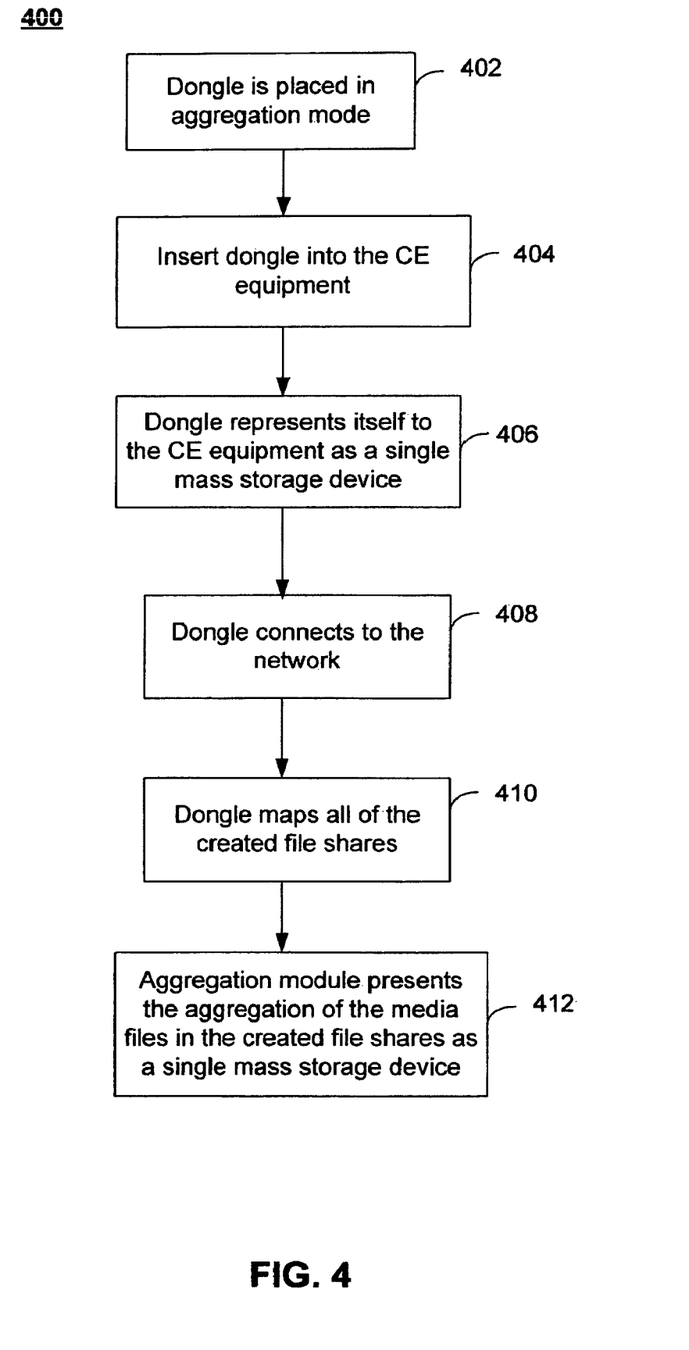
FIG. 4 illustrates one embodiment of a logic flow.

FIG. 4 illustrates one embodiment of a logic flow 400. Each of the blocks in logic flow 400 was described in more detail above and the detail of such will not be repeated. As shown in logic flow 400, the dongle is placed in an aggregation mode (block 402). The dongle is inserted into or connected to CE equipment (such as CE equipment 108 from FIG. 1) (block 404). As noted above, the CE equipment is not required to have any intrinsic networking capabilities, although embodiments are not limited to this. In embodiments, the CE equipment is only required to have the ability to play or display media content that is stored on a mass storage device, such as a Universal Serial Bus (USB) Thumb Drive, Secure Digital (SD) memory card, compact flash memory card, and so forth.

The dongle represents itself to the CE equipment as a single mass storage device (block 406). The dongle automatically connects to the network (block 408). The aggregation module (such as module 117 from FIG. 1) of the dongle maps all of the file shares that were created during consumption mode (block 410). The aggregation module presents the aggregation of the media files in the created file shares as a single mass storage device to the CE equipment (412). Thus, in embodiments, the user may more easily access content stored on various source devices in a network via the CE equipment even though the CE equipment has no intrinsic networking capabilities, without the use of a DMA and without the need for media server software to be running at all times on the source devices. Embodiments of the invention are not limited in this context.

Figure 5:
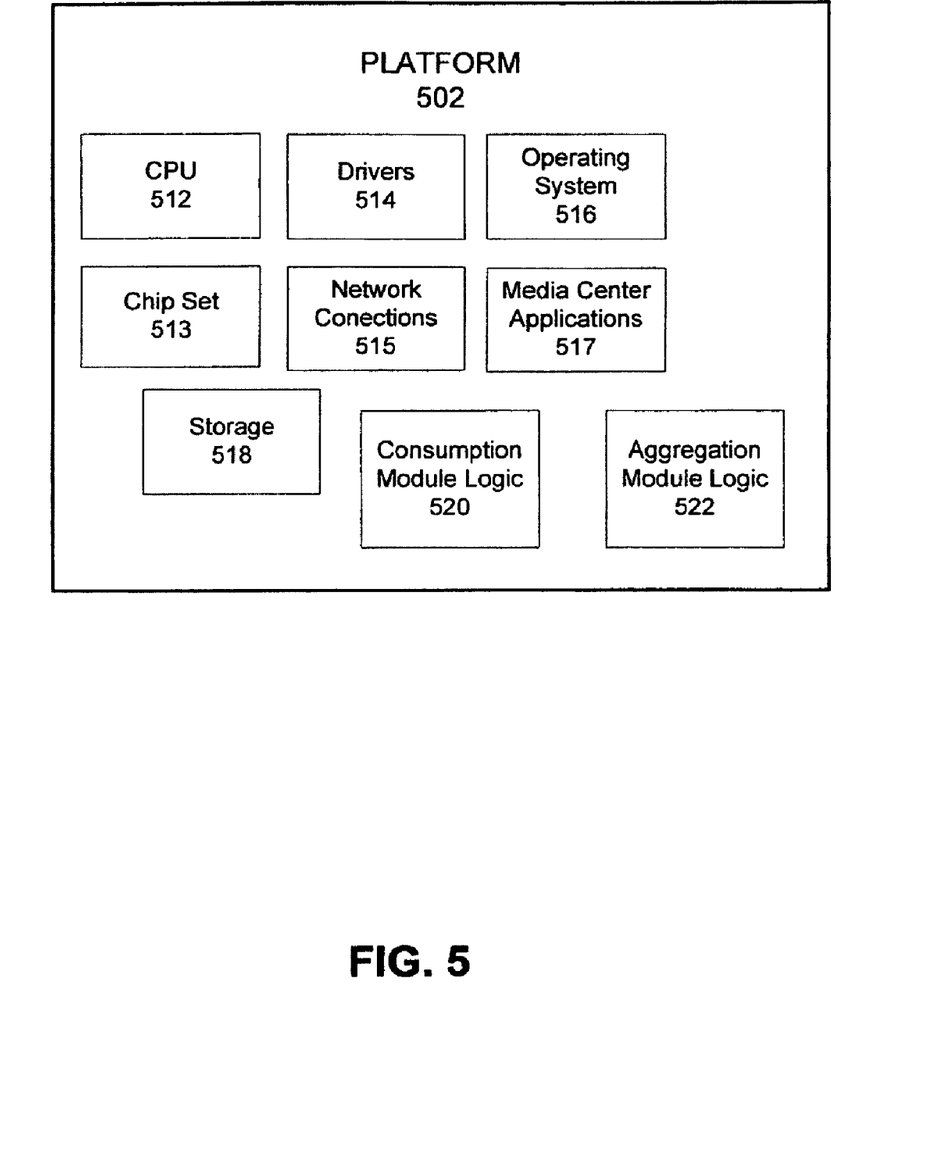
FIG. 5 illustrates one embodiment of a system.

FIG. 5 illustrates an embodiment of a platform 502. Platform 502 may represent a combination of the functionalities of CE equipment 108 and dongle 115 of FIG. 1. In one embodiment, platform 502 may comprise or may be implemented as a media platform 502 such as the Viiv™ media platform made by Intel® Corporation. The dongle may be built using an Intel® Atom™ processor, for example. In one embodiment, platform 502 may interact with content servers (such as servers 102 via network connection 104 from FIG. 1).

In one embodiment, platform 502 may comprise a CPU 512, a chip set 513, one or more drivers 514, one or more network connections 515, an operating system 516, and/or one or more media center applications 517 comprising one or more software applications, for example. Platform 502 also may comprise storage 518, consumption module logic 520 and aggregation module logic 522.

In one embodiment, CPU 512 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 513 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 514 may comprise the Quick Resume Technology Drivers made by Intel® to enable users to instantly turn on and off platform 502 like a television with the touch of a button after initial boot-up, when enabled, for example. In addition, chip set 513 may comprise hardware and/or software support for 5.1 surround sound audio and/or high definition 7.1 surround sound audio, for example. Drivers 514 may include a graphics driver for integrated graphics platforms. In one embodiment, the graphics driver may comprise a peripheral component interconnect (PCI) Express graphics card.

In one embodiment, network connections 515 may comprise the PRO/1000 PM or PRO/100 VE/VM network connection, both made by Intel® Corporation.

In one embodiment, operating system 516 may comprise the Windows® XP Media Center made by Microsoft® Corporation. In other embodiments, operating system 516 may comprise Linux®, as well as other types of operating systems. In one embodiment, one or more media center applications 517 may comprise a media shell to enable users to interact with a remote control device from a distance of about 10-feet away from platform 502 or a display device, for example. In one embodiment, the media shell may be referred to as a "10-feet user interface," for example. In addition, one or more media center applications 517 may comprise the Quick Resume Technology made by Intel®, which allows instant on/off functionality and may allow platform 502 to stream content to media adaptors when the platform is turned "off."

In one embodiment, storage 518 may comprise the Matrix Storage technology made by Intel® to increase the storage performance enhanced protection for valuable digital media when multiple hard drives are included. In embodiments, consumption module logic 520 and aggregation module logic 522 are used to enable the functionality of embodiments of the invention as described herein.

Platform 510 may establish one or more logical or physical channels to communicate information. The information may include media information and control information. Media information may refer to any data representing content meant for a user. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
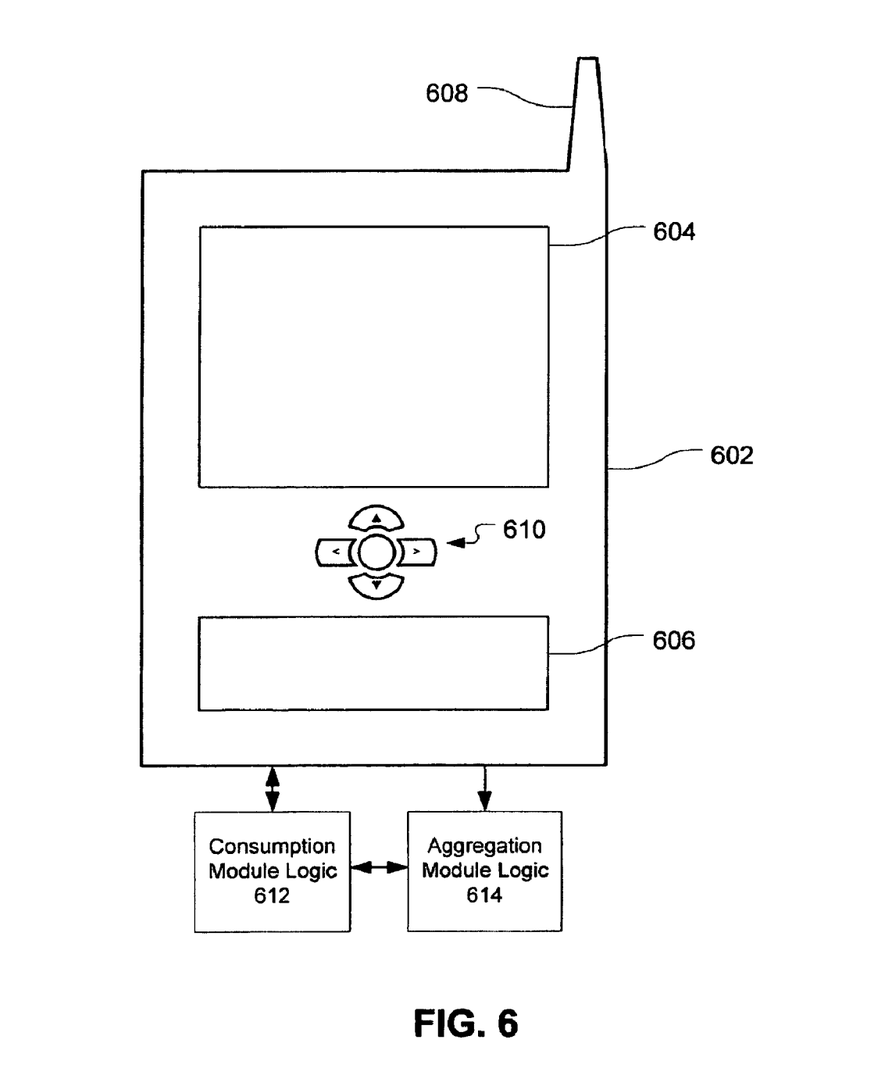
FIG. 6 illustrates one embodiment of a device.

FIG. 6 illustrates one embodiment of a device 600 in which functionality of the present invention as described herein may be implemented. Device 600 may represent a combination of the functionality of CE equipment 108 and dongle 115 of FIG. 1. In one embodiment, for example, device 600 may comprise a communication system. In various embodiments, device 600 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, and so forth. The embodiments are not limited in this context.

In one embodiment, device 600 may be implemented as part of a wired communication system, a wireless communication system, or a combination of both. In one embodiment, for example, device 600 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise a five-way navigation button 610. I/O device 606 may comprise any suitable I/O device for entering information into a mobile computing device. Examples for I/O device 606 may include an alphanumeric keyboard, a numeric keypad, a touch pad, input keys, buttons, switches, rocker switches, a speaker, voice recognition device and software, and so forth. Information also may be entered into device 600 by way of microphone. Such information may be digitized by a voice recognition device. Display 604 may comprise any suitable display unit for displaying information appropriate for a mobile computing device. Device 600 may incorporate or have access to consumption module logic 612 and aggregation module logic 614 to enable the dongle functionality of embodiments of the invention as described herein. In embodiments, the dongle functionality may be implemented via an Intel® Atom™ processor, for example. The embodiments, however, are not limited to the elements or in the context shown or described in FIG. 6.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
  establishing communications between a dongle in a consumption mode and one or more source devices, wherein the one or more source devices are part of a network and store content to be aggregated for output on equipment;
  receiving a user's selection of one or more directory structures on each of the one or more source devices to be included in the aggregated content;
  creating a file share for each of the selected directory structures without storing, on the dongle, the content of the directory structures;
  establishing communications between the dongle in an aggregation mode and the equipment;
  connecting the dongle to the network;
  aggregating content in the created file shares to present the aggregated content as a single mass storage device to the equipment; and
  at the equipment, receiving the content via the network connection of the dongle.

2. The method of claim 1, wherein the equipment has no intrinsic networking capabilities.

3. The method of claim 1, wherein the equipment is a digital television.

4. The method of claim 1, wherein the file share is a network file share.

5. The method of claim 1, wherein the one or more directory structures are directory trees.

6. The method of claim 1, wherein when the dongle is inserted into the one or more source devices, the dongle appears as a Compact Disk-Read Only Memory (CD-ROM) with an autorun file to the one or more source devices.

7. The method of claim 1, further comprising:
  causing the display of the aggregated content overlayed on main content via a user interface.

8. A system, comprising:
  a dongle, wherein the dongle in a consumption mode is configured to be inserted into one or more source devices, wherein the one or more source devices are part of a network and store content to be aggregated for output on equipment, wherein the dongle configured to allow a user to select one or more directory structures on each of the one or more source devices to be included in the aggregated content, and wherein the dongle configured to create a file share for each of the selected directory structures without storing, on the dongle, the content of the directory structures, wherein the dongle in an aggregation mode is configured to be inserted into the equipment, to automatically connect to the network, to aggregate content in the created file shares to present the aggregated content as a single mass storage device to the equipment, and to allow the equipment to receive the content via the network connection of the dongle.

9. The system of claim 8, wherein the equipment has no intrinsic networking capabilities.

10. The system of claim 8, wherein the equipment is a digital television.

11. The system of claim 8, wherein the file share is a network file share.

12. The system of claim 8, wherein the one or more directory structures are directory trees.

13. The system of claim 8, wherein when the dongle is configured to be inserted into the one or more source devices, and is configured to appear as a Compact Disk-Read Only Memory (CD-ROM) with an autorun file to the one or more source devices.

14. The system of claim 8, wherein the equipment causes the display of the aggregated content overlayed on main content via a user interface.

15. A machine-readable storage medium containing instructions which, when executed by a processing system, cause the processing system to perform a method, the method comprising:

establishing communications between a dongle in a consumption mode and one or more source devices, wherein the one or more source devices are part of a network and store content to be aggregated for output on equipment;

receiving a user's selection of one or more directory structures on each of the one or more source devices to be included in the aggregated content;

creating a file share for each of the selected directory structures without storing on the dongle the content of the directory structures;

establishing communications between the dongle in an aggregation mode and the equipment;

connecting the dongle to the network;

aggregating content in the created file shares to present the aggregated content as a single mass storage device to the equipment; and allowing the equipment to receive the content via the network connection of the dongle.

16. The machine-readable storage medium of claim 15, wherein the equipment has no intrinsic networking capabilities.

17. The machine-readable storage medium of claim 15, wherein the equipment is a digital television.

18. The machine-readable storage medium of claim 15, wherein the file share is a network file share.

19. The machine-readable storage medium of claim 15, wherein the one or more directory structures are directory trees.

20. The machine-readable storage medium of claim 15, wherein when the dongle is inserted into the one or more source devices, the dongle appears as a Compact Disk-Read Only Memory (CD-ROM) with an autorun file to the one or more source devices.

* * * * *